(12) United States Patent
Rocchi et al.

(10) Patent No.: US 9,732,790 B2
(45) Date of Patent: Aug. 15, 2017

(54) AERODYNAMIC FOIL BEARING

(71) Applicant: LIEBHERR-AEROSPACE TOULOUSE SAS, Toulouse (FR)

(72) Inventors: Jerome Rocchi, Roqueseriere (FR); Gregory Grau, Castelmayran (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 0 days.

(21) Appl. No.: 15/100,617

(22) PCT Filed: Dec. 5, 2014

(86) PCT No.: PCT/FR2014/053189
§ 371 (c)(1),
(2) Date: Sep. 12, 2016

(87) PCT Pub. No.: WO2015/082862
PCT Pub. Date: Jun. 11, 2015

(65) Prior Publication Data
US 2016/0369838 A1 Dec. 22, 2016

(30) Foreign Application Priority Data
Dec. 5, 2013 (FR) ...................................... 13 62192

(51) Int. Cl.
F16C 32/06 (2006.01)
F16C 17/02 (2006.01)
F16C 27/02 (2006.01)

(52) U.S. Cl.
CPC ............ *F16C 17/024* (2013.01); *F16C 27/02* (2013.01); *F16C 2204/52* (2013.01); *F16C 2360/23* (2013.01)

(58) Field of Classification Search
CPC ............................ F16C 17/024; F16C 17/042
See application file for complete search history.

(56) References Cited

U.S. PATENT DOCUMENTS

| 4,213,657 A * | 7/1980 | Gray ..................... F16C 17/042 |
| | | 384/105 |
| 4,277,113 A | 7/1981 | Heshmat |
| 8,070,873 B2 * | 12/2011 | Lee ........................... C23C 4/02 |
| | | 106/287.18 |

(Continued)

FOREIGN PATENT DOCUMENTS

EP 017207 A1 6/1996
EP 2287479 A1 2/2011

(Continued)

OTHER PUBLICATIONS

Y. B. Lee et al.: "Dynamic characteristics of a flexible rotor system supported by a viscoelastic foil bearing(VEFB)", Tribology International, vol. 37, pp. 679-687, Jan. 27, 2003.

(Continued)

*Primary Examiner* — Thomas R. Hannon
(74) *Attorney, Agent, or Firm* — Volpe and Koenig, P.C.

(57) ABSTRACT

This aerodynamic foil bearing has a sleeve (4) inside which are arranged:
a foil referred to as the top foil (16), and
a bump foil (14) arranged between the top foil (16) and the sleeve (4),
a foil (12) of viscoelastic material arranged between an inner face of the sleeve (4) and the bump foil (14).

7 Claims, 3 Drawing Sheets

(56) References Cited

U.S. PATENT DOCUMENTS

| | | | |
|---|---|---|---|
| 9,222,509 B2* | 12/2015 | Swanson | F16C 27/02 |
| 2003/0169951 A1 | 9/2003 | Nishijima et al. | |
| 2005/0201646 A1 | 9/2005 | Nagata et al. | |
| 2006/0018575 A1 | 1/2006 | Yum et al. | |
| 2007/0211970 A1* | 9/2007 | Nagata | F16C 17/024 |
| | | | 384/104 |

FOREIGN PATENT DOCUMENTS

| | | |
|---|---|---|
| EP | 2375089 A2 | 10/2011 |
| FR | 2670545 A1 | 6/1992 |
| KR | 20040029700 A | 4/2004 |
| WO | 2008153226 A1 | 12/2008 |
| WO | 2011025087 A1 | 3/2011 |

OTHER PUBLICATIONS

Y. B. Lee et al.: "Unbalance response of a super-critical rotor supported by foil bearings-Comparison with test results", Tribology Transaction, vol. 47, pp. 54-60, Jan. 1, 2004.

K. Nalepa: "Development of the Foil Bearing Technology", Technical Sciences, vol. 12, 2009, pp. 229-240, XP002727807, DOI: 10.2478/v10022-009-0019-2, p. 235-p. 237.

* cited by examiner

AERODYNAMIC FOIL BEARING

FIELD OF THE INVENTION

The present invention relates to an aerodynamic foil bearing.

BACKGROUND

An aerodynamic bearing, or air bearing, is a bearing that supports the load it is subjected to via a pressurized mass of air that is introduced between a rotor rotating at high speed and a stator. Bearings of this type are used, for example, in applications in which the rotors rotate at high speeds, where loads are generally limited and/or high precision is required. The use of air instead of a fluid such as oil to create lubrication between the rotor and stator serves to limit the power dissipated by fluid friction, because the viscosity of air is much less than that of an oil, even if the oil is not very viscous.

To provide lubrication during the startup and shutdown phases, when the air pressure between the rotor and the stator is insufficient for maintaining a bearing film between these two parts, it is known to introduce a foil structure between the rotor and the stator to provide lubrication at low rotation speeds with minimal disruption to the operation of the bearing at high speeds.

US document 2005/0201646 discloses an air bearing with a foil sheet forming a closed loop with several tops and a corresponding number of bulged arcuate surfaces. An elastic or viscoelastic material is filled in the air gap between the foil and a corresponding stator. In that document, the geometry of the foil bearing forms a naturally converging shape without requiring deformation of the flexible structure of the bearing. The elastic or viscoelastic material provides an elastic quality and/or a damping quality.

Document WO-2011/025087 shows a foil-air bearing having a top foil along the inner periphery of the hole of the bearing housing. A corrugated foil mounted on stiffeners (called a "bump foil") is placed between the top foil and the inner surface of the hole. The bump foil provides both stiffness and damping in the association between the rotor and its bearing.

Document KR-20040029700 implements a combination of a structure similar to that illustrated in WO-2011/025087 and a viscoelastic foil which comes above the top foil and is therefore intended to come in contact with the rotor. The structure proposed here allows a higher rotational speed while damping the vibrations of the rotor.

The present invention aims to provide a bearing that achieves both a viscous damping and a frictional damping but the two damping effects are decoupled. Advantageously, a bearing according to the invention will at least partly absorb the subsynchronous vibratory phenomena that can be observed in the aerodynamic bearings of the prior art.

Preferably, the invention proposes a structure that is simple to implement and to apply.

SUMMARY

To this end, the invention proposes an aerodynamic foil bearing having a sleeve within which are arranged:
 a foil referred to as the top foil, and
 a bump foil arranged between the top foil and the sleeve.
According to the invention, such an aerodynamic bearing further comprises a foil of viscoelastic material arranged between an inner face of the sleeve and the bump foil.

The addition of a foil of viscoelastic material allows creating a viscous damping. Its novel positioning allows decoupling the damping provided by friction (Coulomb damping obtained between the bump foil and the top foil) and the viscous damping. Surprisingly, such a structure at least provides substantial damping of the subsynchronous frequencies of the rotor, enabling greater stability for the rotor, even at (very) high rotational speeds.

To improve the frictional damping properties of a bearing according to the invention, it is proposed that such an aerodynamic foil bearing further comprises a protective foil arranged between the foil of viscoelastic material and the bump foil. This protective foil may be made, for example, of a nickel-based alloy containing chromium. In a preferred embodiment, it is a foil made from an alloy sold under the Inconel trademark.

To achieve mechanical retention of the viscoelastic foil, without the use of adhesive, it is proposed that the inner face of the sleeve comprises a longitudinal rib of a thickness substantially corresponding to the thickness of the foil of viscoelastic material. The bump foil has two longitudinal edges relative to the sleeve, one edge forming a free end and the other edge here being advantageously fixed to the longitudinal rib.

The invention also relates to a turbomachine and/or an air conditioning device, characterized in that it comprises an aerodynamic bearing as described above.

BRIEF DESCRIPTION OF THE DRAWINGS

Details and advantages of the invention will become clear from the following description with reference to the accompanying drawings, in which.

DETAILED DESCRIPTION OF THE PREFERRED EMBODIMENTS

Figure 1:
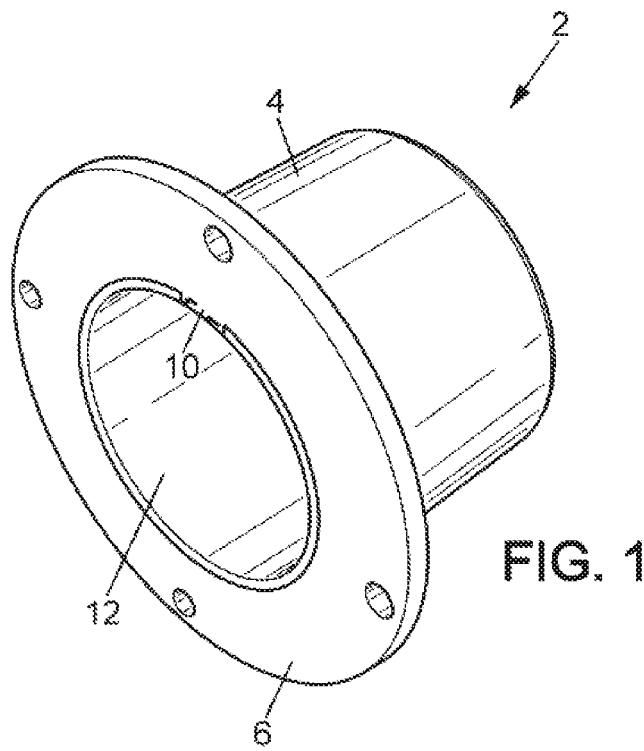
FIG. 1 is a perspective view of a sheath used for the implementation of the invention.

FIG. 1 illustrates a sheath 2 which is used for the implementation of the invention. This is a metal part which has a sleeve 4 of circular cylindrical shape and a mounting flange 6 at one end of the sleeve 4.

Figure 2:
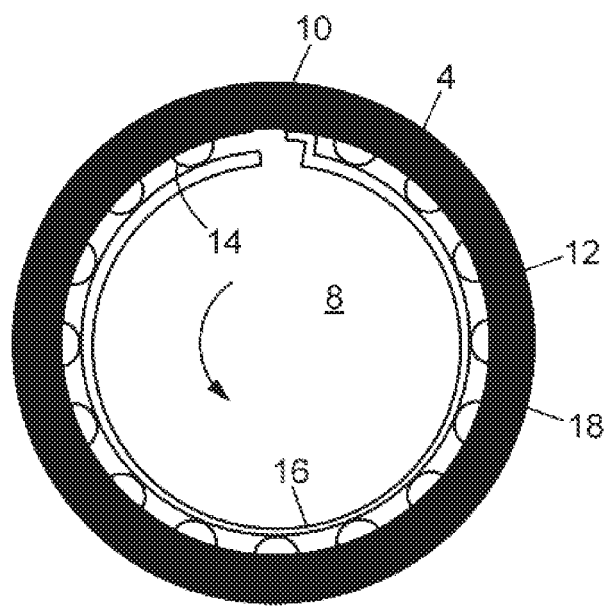
FIG. 2 is a schematic cross-sectional view of a bearing according to the invention.

The sleeve 4 defines a circular cylindrical housing for accommodating a rotor 8 (FIG. 2). This housing comprises an inner surface of generally circular cylindrical shape. However, one will note the presence of a longitudinal rib 10 which extends along the entire length of the housing and which projects inside the housing.

On either side of the rib 10, a foil called a viscoelastic foil 12 covers the inner surface of the housing. The viscoelastic foil 12 and the rib 10 are of shapes adapted so that together they create an inner circular cylindrical surface concentric to the surface of the housing of the sleeve 4.

The viscoelastic foil 12 is made of a viscoelastic material. The material used here may be selected, for example, from among silicones, natural or synthetic rubbers, acrylics, or macromolecular gels. One (or more) elastic members may be embedded in the viscoelastic foil 12. In this manner, springs or a bump foil may possibly be associated with the viscoelastic material of the viscoelastic foil 12.

In a preferred embodiment, the viscoelastic foil 12 is selected to withstand relatively high temperatures, up to and beyond 200° C. It can then be made (with or preferably without elastic member) of a material used for the production of O-rings, for example a material bearing the reference 7DF710A and sold under the trademark "le joint français". This material can be used up to 250° C. while still maintaining its viscoelastic properties.

On top of the viscoelastic foil 12 is a corrugated foil 14, better known as a bump foil.

Any type of known bump foil for air bearings can be used here. The orientation of the bump foil 14 can also be changed. In the embodiment represented, the bumps are in the shape of substantially semicircular half-cylinders. The rounded portions of the half-cylinders are oriented upwards (towards the rotor). Alternatively, they can be oriented downwards (towards the sheath).

The bump foil 14 may, for example, be a foil having longitudinal corrugations repeated at a regular pitch. The shape of the corrugations, the pitch, and the complexity of the patterns may vary. For example, FIG. 2 of document EP-0717207 shows various possible corrugation shapes. It is also possible to have multiple bump foils, for example as shown in document FR-2670545 which provides a first bump foil called an external spring element (denoted 6 in the drawing) and a second bump foil called an intermediate spring element (denoted 5 in the drawing).

The bump foil 14 has two longitudinal edges relative to the corrugations of said bump foil and to the sleeve 4. Each longitudinal edge thus forms one end of the bump foil 14 and these two ends are close to one another such that the bump foil 14 is curved and has a substantially cylindrical shape. Usually, the bump foil 14 has a fixed end with respect to the housing that receives it, and a free end. Preferably, the fixed end is fastened to the sleeve 4 at the longitudinal rib 10.

A top foil 16 is intended to be face to face with the rotor 8. It is able to affect the formation of a fluid film (film of air) between the rotor 8 and itself. This top foil 16 is a flexible sheet that is curved to form a substantially circular cylindrical shape around the rotor 8. The nature of the material used to create this foil and its thickness give it a relatively low stiffness, allowing it to conform to the shape of the rotor. The top foil 16 should also ensure there is a sufficient air gap for the fluid during a startup phase and/or low load phase.

The top foil 16 may, for example, be made of metal and is then for example of stainless steel, phosphor bronze, brass, copper, aluminum (or an alloy based on these metals), or be made of a resin such as PTFE (polytetrafluoroethylene). As an illustrative and non-limiting example, the thickness of the top foil may be between 10 and 100 μm (1 μm=$10^{-6}$ m).

In a preferred embodiment, as illustrated in FIG. 2, a protective foil 18 is arranged between the bump foil 14 and the viscoelastic foil 12. The material used here may be a nickel-based alloy. A preferred embodiment provides for the use of an alloy marketed under the Inconel trademark, for example Inconel 750.

The protective foil 18 thus serves as the interface between the viscoelastic foil 12 and the bump foil 14 and provides support for the latter.

A bearing as described above allows generating a viscous damping and absorbing subsynchronous vibratory phenomena. For illustration, FIGS. 3 and 4 compare the dynamic behavior of a rotor supported by a "conventional" bearing, meaning a bearing without a viscoelastic layer corresponding to the viscoelastic foil 12 (FIG. 3), with that of a bearing according to the invention with a viscoelastic layer between the sheath and its bump foil (FIG. 4).

Figure 3:
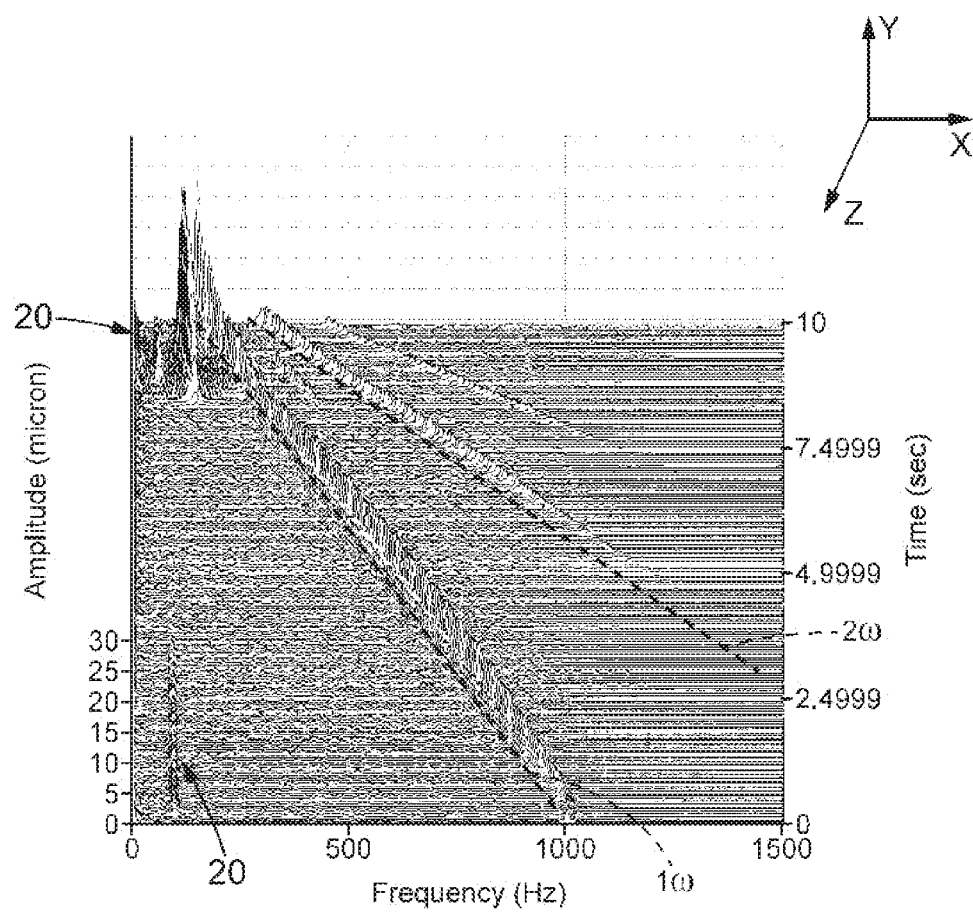
FIG. 3 is a three-dimensional graph illustrating the frequencies obtained with a bearing without viscoelastic material.
Figure 4:
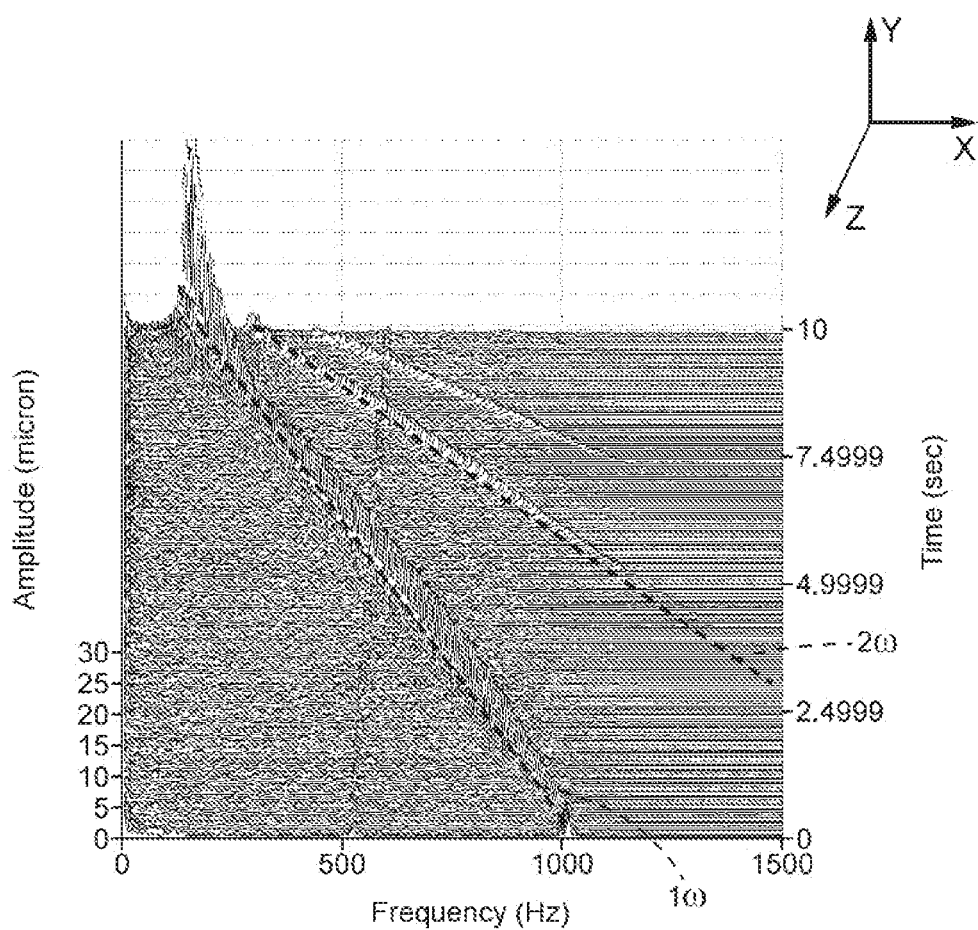
FIG. 4 is a view similar to that of FIG. 3 but for a bearing according to the invention.

FIGS. 3 and 4 show a recording of the displacements of the rotor 8 during a deceleration from 60,000 revolutions per minute (rpm), therefore corresponding to a frequency of 1,000 Hz, to 10,000 rpm corresponding to approximately 166 Hz. These figures represent a set of Fourier transforms (FFT) for a succession of moments. The x-axis represents the frequency, the y-axis corresponds to the amplitude of the associated displacement, while the z-axis represents time.

In each figure (FIGS. 3 and 4), we can see a main line identified as $1\omega$ which represents the main harmonic, therefore corresponding to the rotational speed. A second line identified as $2\omega$ corresponds to the first harmonic at twice the frequency of the main harmonic. All frequencies below (less than) line $1\omega$ are called "subsynchronous" frequencies and are related to instabilities in bearing function.

In FIG. 3, we can see that the frequency content obtained reveals such "subsynchronous" frequencies 20. Instabilities in bearing function are therefore identified with a bearing with no viscoelastic foil.

However, in FIG. 4 we note that the frequency content obtained does not reveal any "subsynchronous" frequencies, which corresponds to the behavior of a bearing with high stability.

In contrast to a "conventional" bearing of the prior art, the structure proposed above allows adding to the bearing of the invention a viscous type of damping in addition to the damping related to the film of air and the damping related to friction in the foil structure (bump foil 14 and top foil 16).

This structure can be used for machines running at very high speeds, exceeding 100,000 rpm. For such high speeds, care must be taken to choose for the viscoelastic foil 12 a material that maintains its properties at high temperatures (up to 200° C. or even 250° C.).

When such speeds are reached, stresses related to unbalances present in the rotor become larger even if the balance grade remains the same. In contrast to bearings of the prior art with no viscoelastic layer, the bearing structure proposed by the invention allows introducing additional damping which absorbs the additional stresses associated with electric machines operating at very high speeds.

The assembly proposed by the invention, with the viscoelastic foil "below" the bump foil, allows assembly without adhesive. The viscoelastic foil mounted on either side of the longitudinal rib as described above is mechanically retained in the sheath. Axial retention is achieved for example in a conventional manner with retaining flanges that retain the entire foil bearing. This absence of adhesive is a factor which enables the use of the bearing at high speeds (and therefore also at higher temperatures), as few glues can withstand temperatures above 180° C.

When a protective foil is provided, the bump foil is movable relative to said protective foil. Friction is thus achieved and induces Coulomb damping.

The described structure allows viscous damping and conventional frictional damping, but these two damping effects are decoupled. The corrugations of the bump foil can continue to move relative to the smooth top foil (and possibly also relative to the protective foil, which is also smooth), creating Coulomb damping. The viscous damping provided by the viscoelastic layer is independent of this frictional damping. Here a novel feature is added (viscous damping) without influencing or damaging the damping qualities already present in the bearing.

The invention is not limited to the preferred embodiment illustrated in the accompanying drawing nor to the variant embodiments discussed. It also relates to all variants within reach of the skilled person that lie within the scope of the following claims.

What is claimed is:

1. Aerodynamic foil bearing having a sleeve (4) inside which are arranged:
    a foil referred to as the top foil (16), and
    a bump foil (14) arranged between the top foil (16) and the sleeve (4), and
    a foil (12) of viscoelastic material arranged between an inner face of the sleeve (4) and the bump foil (14).

2. The aerodynamic foil bearing according to claim 1, further comprising a protective foil (18) arranged between the foil (12) of viscoelastic material and the bump foil (14).

3. The aerodynamic foil bearing according to claim 2, wherein the protective foil (18) is made of a nickel-based alloy containing chromium.

4. The aerodynamic foil bearing according to claim 1, wherein the inner face of the sleeve (4) comprises a longitudinal rib (10) of a thickness substantially corresponding to the thickness of the foil (12) of viscoelastic material.

5. The aerodynamic foil bearing according to claim 4, wherein the bump foil (14) has two longitudinal edges relative to the sleeve (4), one edge forming a free end and the other edge being fixed to the longitudinal rib (10).

6. Turbomachine, comprising an aerodynamic bearing according to claim 1.

7. Air conditioning device, comprising an aerodynamic bearing according to claim 1.

* * * * *